(No Model.)

A. D. DUNLAVY.
NUT LOCK.

No. 600,308. Patented Mar. 8, 1898.

Witnesses
J. G. Cross
Chas. E. Brock

Inventor
Albert D. Dunlavy
by O'Meara & Co.
Attorneys

UNITED STATES PATENT OFFICE.

ALBERT D. DUNLAVY, OF STEUBENVILLE, OHIO.

NUT-LOCK.

SPECIFICATION forming part of Letters Patent No. 600,308, dated March 8, 1898.

Application filed October 15, 1897. Serial No. 655,296. (No model.)

*To all whom it may concern:*

Be it known that I, ALBERT D. DUNLAVY, residing at Steubenville, in the county of Jefferson and State of Ohio, have invented a new and useful Nut-Lock, of which the following is a specification.

This invention relates to improvements in nut-locks, and has for its object to provide a device of this character which will be cheap and simple and yet completely effective in operation.

My improved nut-lock is especially adaptable for use in connection with the angle-bars by which the separate rails in a railway-track are bound together; but it may be used in locking nuts of any character.

My invention comprehends also the use of a special washer upon a chambered and grooved plate through which the bolt is projected; but such chambered and grooved plate may be of integral formation with the bearing plate or surface through which the bolt is passed.

A conspicuous advantage of my improved nut-lock consists in its few parts and in the fact that none of them are liable to detachment, so as to fall apart, as in the case of nuts secured by a detachable key, which may be shaken out by oscillation or tampered with by unauthorized persons. In my device the parts are coacting and interlocking, the nut locks the washer, and the washer locks the nut, and both are held in rigid engagement with each other until release is effected by the use of suitable tools.

A further advantage is that unlocking is not effected by the breaking of the exterior projecting portion of the washer, such action resulting in the more effectual locking of the nut upon the bolt.

The above and other novel and advantageous features of my device are hereinafter fully set forth and shown.

Figure 1:
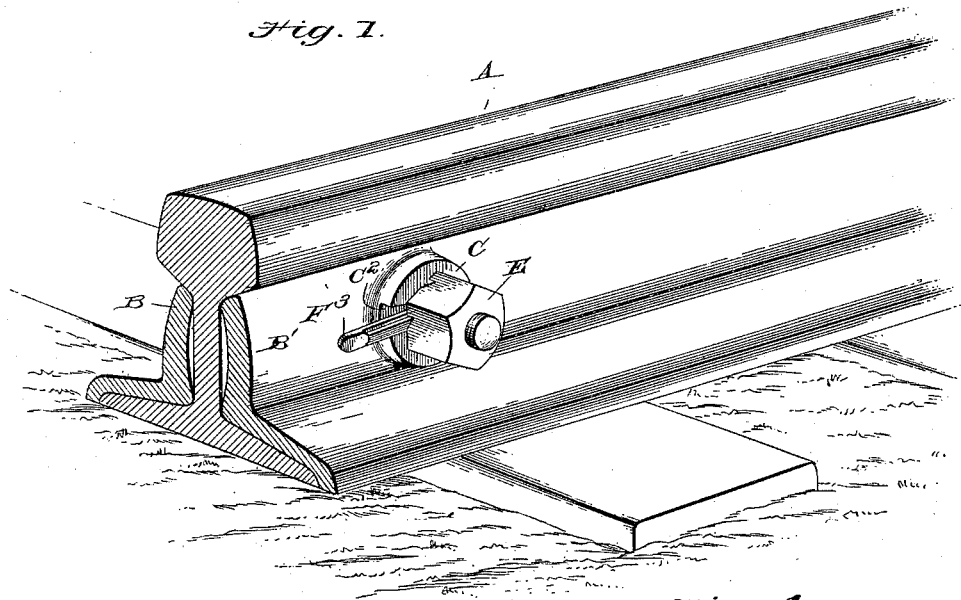
Figure 2:
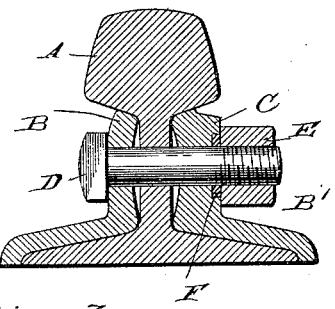
Figure 4:
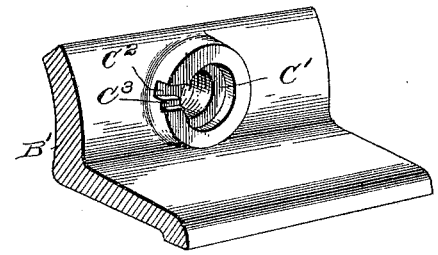
Figure 3:
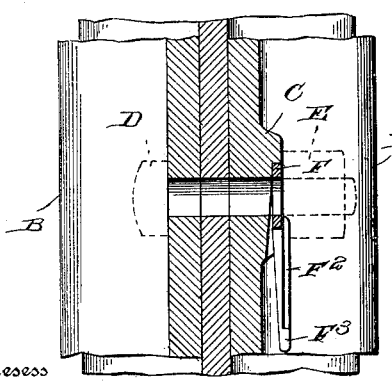
Figures 5, 6:
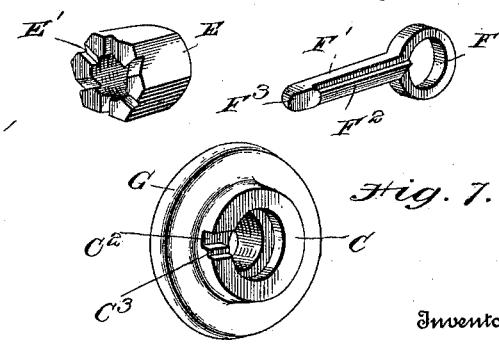
Figure 7:
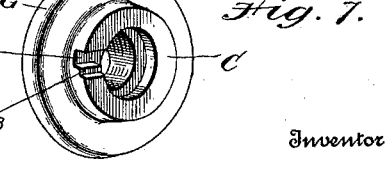

In the drawings herewith, forming a part of this specification, in which like parts are indicated by similar letters of reference, Figure 1 is a perspective view of a railway-track rail having, in connection with the angle-bars, bolt, and nut, my improved nut-lock. Fig. 2 is a cross-sectional view of a rail intersected centrally by a bolt-aperture, the nut being also in section. Fig. 3 is a longitudinal sectional view of a rail equipped with my improved lock mechanism, the bolt and nut being shown in dotted lines. Fig. 4 is a detail perspective view showing a section of angle-plate. Fig. 5 is a detail perspective view of the nut. Fig. 6 is a detail perspective view of the lock washer and key. Fig. 7 is a detail perspective view of a washer which may be used with my improved lock washer and key.

Like letters of reference mark the same parts wherever they occur in the different figures of the drawings.

My improved device is illustrated in connection with the construction of a railway-track; but, as is obvious, such application is but one of its many uses.

In the drawings herewith, A is a rail, B and B' the angle-bars, and C an integral raised gasket or flange on bar B', of washer form.

D is a bolt of ordinary construction.

E is a nut, also of ordinary construction, except that its bearing-face is provided with a plurality of ratchet-teeth E', formed as shown.

In the outer face of the gasket or flange C, I provide, encircling the bolt-aperture, an annular recess C', with a channel $C^2$ leading thereinto from the vertical edge of the plate. In the lower edge of said channel $C^2$, I provide a shallower recess $C^3$ of the same longitudinal extent as the channel $C^2$. I next provide a lock washer or key. (Shown in detail in Fig. 6.)

F is a ring or washer adapted to encircle the bolt D and rest loosely in the recess C'. F' is a stem projected laterally from said washer F, said stem being adapted to rest within the channel $C^2$.

$F^2$ is a longitudinal rib projected or raised upon the outer surface of stem F', the said portion being inclined on one side and cut square upon the other and of such contour in cross-section as to be adapted for engagement with the ratchet-teeth E' upon the nut E.

The parts having been constructed as above described, the operation of my device is as follows: The bolt D having been passed through the fish-plate B, the web of the rail A, and the angle-bar B', the washer F is then placed over the bolt, the stem F' resting in the channel C², with the raised portion F² directly outward. The nut E is then applied to the screw-threaded end of the bolt and rotated down upon the washer F. As the inner surface of the nut bears against the washer, which in turn is forced against the bottom of recess C', the stem F' of the washer will be raised in the channel C² and the raised portion F² of the stem engage successively with the ratchet-teeth E' of the nut until the same cannot be further rotated. The nut is then slightly rotated in an opposite direction, which will cause the stem F' to be partly projected into the shallower recess C³. The nut E is thus effectually locked and cannot be backwardly rotated until by the use of tools the stem F' is sufficiently depressed to cause an avoidance of the contact between the raised edge F² and the ratchet-teeth E'. The stem F' should be of moderately-resilient metal, so that this disengagement may be effected, but not sufficiently so as to permit it being pressed inwardly by hand. The stem F' is designed both to support the projected edge F³ as well as for effecting the disengagement of the locking edge F² with the ratchet-teeth E' in nut E. The breaking off of the projected end of the stem F' will not release the inner portion from its engagement with the ratcheted face of the nut.

In the detail view Fig. 7 is shown a separate washer G, having an annular raised ring or flange with the shouldered recess C'. The channels C² and C³ are formed transversely of the annular edge and serve the same purpose as the channels shown in the other plates. The annular ring or flange G may be provided upon any bearing-surface to which a nut is to be applied, or a detachable plate may be employed, with any adequate means for preventing the rotation of such flange upon the bolt.

My improved device admits of many modifications of form and construction not foreign to the principle involved in my invention primarily.

I am aware of the existence of devices in which a ratcheted nut is forced against a ratcheted bearing-plate and thereby locked against backward rotation. I am not, however, aware of any invention in which a nut having an inner ratcheted surface is projected against a washer resting upon or against an inclined bearing-plate, said washer having a projected stem portion adapted to engage with the ratchet-teeth of the nut as the latter is tightened upon the bolt.

Having thus described my invention, what I claim as new, and desire to secure by Letters Patent, is—

1. An improved nut-lock, consisting of a recessed bearing-plate, a bolt projected therethrough, a washer adapted to encircle said bolt and to rest within said recess, an outwardly-projected stem formed laterally upon said washer, a longitudinal raised edge upon said stem, and ratchet-teeth formed in the inner face of the nut adapted to be engaged by the edge of said stem when the nut is rotated upon the bolt end, all substantially as herein shown and described.

2. The combination with a screw-threaded bolt, nut and bearing-plate, of a nut-lock, consisting of a recessed bearing-plate, said recess having an inclined bottom, a washer adapted to encircle said bolt and rest within said recess, a stem projected laterally from said washer having an inclined edge, said stem adapted to rest within a channel opening into said recess and a nut having its inner face serrated or ratcheted so as to be engaged by said stem when rotated inwardly upon said bolt, all substantially as and for the purpose herein shown and set forth.

3. The combination in a nut-lock of a recessed bearing-plate, said recess having an inclined bottom and a channel leading outwardly therefrom, a washer adapted to rest within said recess provided with a lateral stem adapted to rest within said channel, a nut with an inner ratcheted face, said ratchets of the nut adapted to be engaged by the outwardly-projected edge of the stem when the nut is rotated upon the said washer, all substantially as herein shown and set forth.

4. An improved nut-lock, consisting of a recessed bearing-plate, said recess encircling the bolt-aperture and having an inclined bottom, a washer adapted to rest within said recess and encircling said bolt, a stem projected laterally from said washer resting normally in a channel extending from said recess to the outer edge of the bearing-plate, and a nut provided with a serrated or ratcheted inner face, said ratcheted face adapted to be engaged by the edge of said stem when the same is outwardly projected by the nut being forced against the washer and the washer against the inclined bottom of the recess, all substantially as herein shown and set forth.

5. The combination with a recessed bearing-plate, said recess having an inclined bottom and lateral channel, of a washer adapted to rest loosely therein and having a lateral stem adapted to rest within said channel, a longitudinal beveled edge projected from said stem, a screw-threaded bolt projected through said recessed portion of the plate, and a nut having an inner ratcheted face adapted to be engaged by the said projected edge of said stem as the nut is rotated inwardly, so that said nut will thereby be locked against backward rotation, all substantially as herein shown and described.

6. The combination in a nut-lock, of a bearing plate or surface having a recess with inclined bottom and a lateral channel leading therefrom, a washer adapted to rest therein and provided with a stem adapted to rest in said lateral channel, a bolt having its screw-threaded end projected through said plate and washer, and a nut having an inner serrated face adapted to be engaged by the edge of said stem when the latter is lifted from its channel by the bearing of the nut upon the washer and the washer against the inclined bottom of the recess, all substantially as herein shown and set forth.

A. D. DUNLAVY.

Witnesses:
W. P. KELLY,
JOHN H. ROBERTS.